Figure 1:
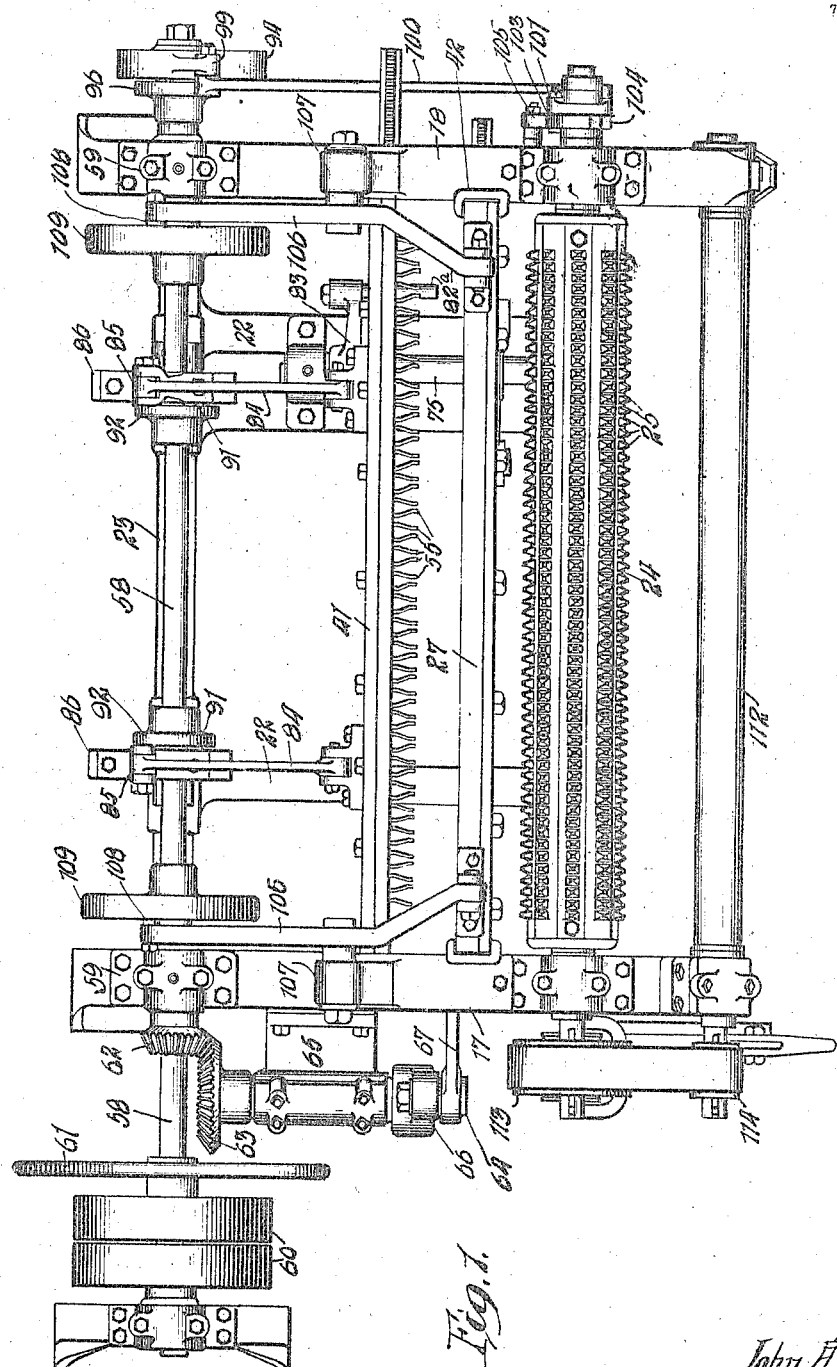

J. A. HOLMQUIST.
MACHINE FOR MAKING WIRE NETTING AND FIELD FENCING.
APPLICATION FILED JUNE 18, 1909.

951,610.

Patented Mar. 8, 1910.

7 SHEETS—SHEET 1.

Witnesses:
Wm. P. Bond
Pierson W. Banning

Inventor:
John A. Holmquist
by Banning & Banning
Atty's

J. A. HOLMQUIST.
MACHINE FOR MAKING WIRE NETTING AND FIELD FENCING.
APPLICATION FILED JUNE 18, 1909.

951,610.

Patented Mar. 8, 1910.

J. A. HOLMQUIST.
MACHINE FOR MAKING WIRE NETTING AND FIELD FENCING.
APPLICATION FILED JUNE 18, 1909.
951,610.
Patented Mar. 8, 1910.
7 SHEETS—SHEET 3.
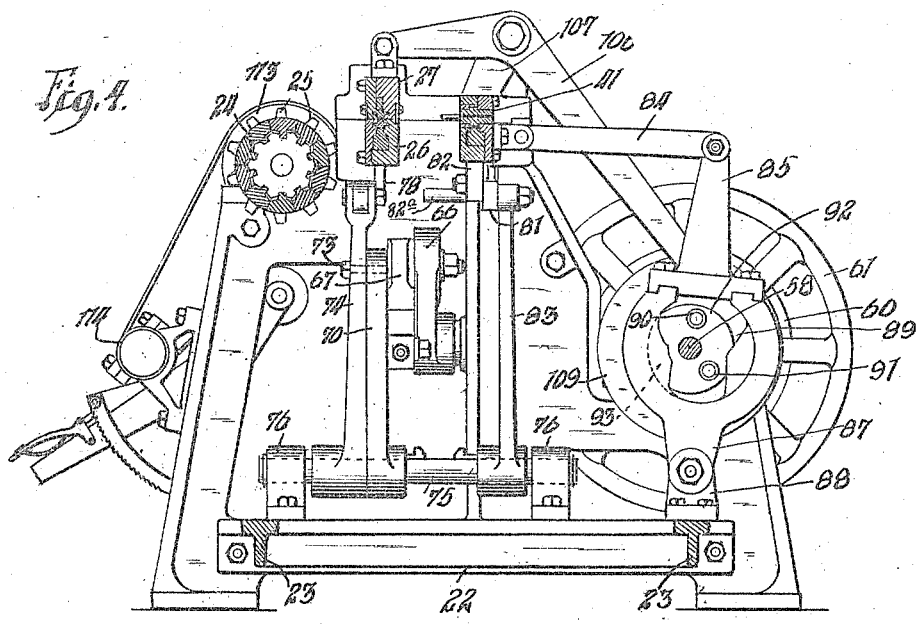
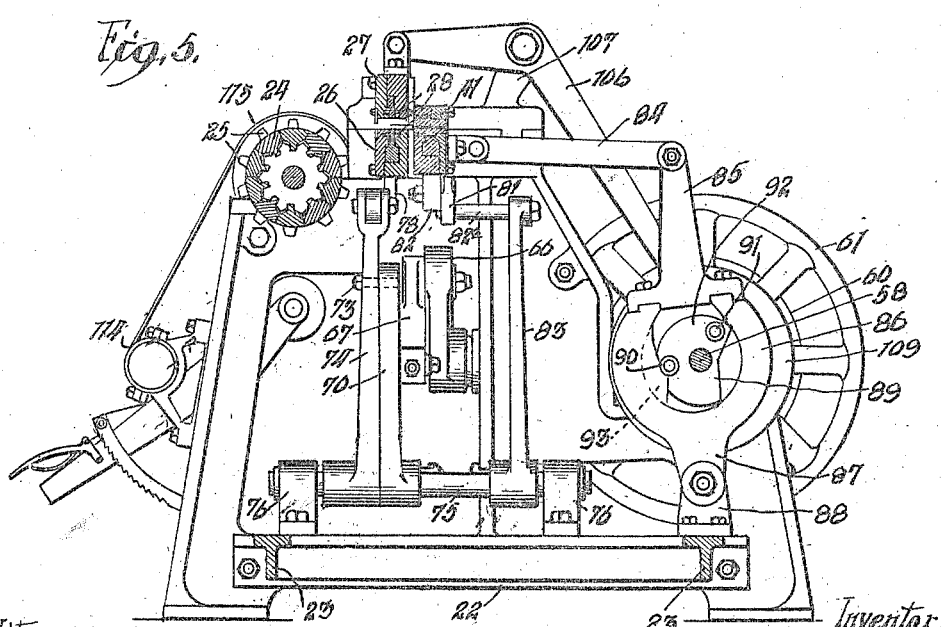

J. A. HOLMQUIST.
MACHINE FOR MAKING WIRE NETTING AND FIELD FENCING.
APPLICATION FILED JUNE 18, 1909.

951,610.

Patented Mar. 8, 1910.

7 SHEETS—SHEET 4.

Witnesses:
W. P. Bond
Pirson W. Banning

Inventor:
John A. Holmquist
by Banning & Banning
Attys.

J. A. HOLMQUIST.
MACHINE FOR MAKING WIRE NETTING AND FIELD FENCING.
APPLICATION FILED JUNE 18, 1909.

951,610.

Patented Mar. 8, 1910.

7 SHEETS—SHEET 5.

Witnesses:
Wm. P. Bond
Pierson W. Banning.

Inventor:
John A. Holmquist
by Banning & Banning
Attys.

J. A. HOLMQUIST.
MACHINE FOR MAKING WIRE NETTING AND FIELD FENCING.
APPLICATION FILED JUNE 18, 1909.

951,610.

Patented Mar. 8, 1910.

7 SHEETS—SHEET 6.

Witnesses:

Inventor:
John A. Holmquist
by Banning & Banning
Attys.

J. A. HOLMQUIST.
MACHINE FOR MAKING WIRE NETTING AND FIELD FENCING.
APPLICATION FILED JUNE 18, 1909.

951,610.

Patented Mar. 8, 1910.

7 SHEETS—SHEET 7.

Witnesses:
Wm. P. Bond
Pierson W. Banning.

Inventor:
John A. Holmquist
by Banning & Banning
Attys.

UNITED STATES PATENT OFFICE.

JOHN A. HOLMQUIST, OF PUEBLO, COLORADO.

MACHINE FOR MAKING WIRE-NETTING AND FIELD-FENCING.

951,610.  Specification of Letters Patent.  Patented Mar. 8, 1910.

Application filed June 18, 1909. Serial No. 502,906.

*To all whom it may concern:*

Be it known that I, JOHN A. HOLMQUIST, a citizen of the United States, residing at Pueblo, in the county of Pueblo and State of Colorado, have invented certain new and useful Improvements in Machines for Making Wire-Netting and Field-Fencing, of which the following is a specification.

This invention relates to that class of fence machine which is employed in weaving poultry fencing or similar fencing, either with or without longitudinal strand wires, although the fencing woven by the present machine is not of the standard type, but differs therefrom in several important features which will be hereinafter referred to. In weaving wire fencing of this general character, in which the meshes are of substantially diamond shape, it has been the general practice to employ a plurality of twisters through holes or arms in which the wires are fed, which twisters are adapted to be revolved at stated intervals to form the twists which unite the meshes together.
In the use of twisters of this type, it is obvious that only a single line of meshes can be formed at a given operation, for the reason that, in forming the twists, the wires are carried bodily over and under one another, so that such an operation can take place only at the rear end of the fabric as it advances through the machine.

The main object of the present invention is to so construct the machine that two lines of meshes can be formed at the same time, thereby practically doubling the speed of the operation of the machine. The rear of each two lines of meshes will be formed by revolving twisters of the usual type in which the wires are carried bodily over and under one another, and the forward line of meshes will be simultaneously formed by split coilers which engage the overlapping bends or angles of adjacent meshes, and coil them over and under one another to form lock twists, in the manner to be hereinafter described.

The completed fencing will be formed to provide alternate lines of ordinary twists and locking coils, each of which styles of twists furthermore alternate between right hand twists and left hand twists, with the result that the mesh wires will engage the strand wires in such a manner as to prevent longitudinal slipping with the consequent narrowing of the fence fabric when subjected to longitudinal strain.

A further object of the invention is to so construct and mount the rear cross head which carries the rear set of twisters that it will advance with the progression of the completed fencing, in order to guide and position the unwoven strands of wire between the split coilers in preparation for the next revolving of the split coilers and the formation of the locking coils.

Further objects will appear from a detailed description of the invention, which consists in the machine as a whole and in the individual parts thereof, as hereinafter described and pointed out in the claims.

Figure 2:
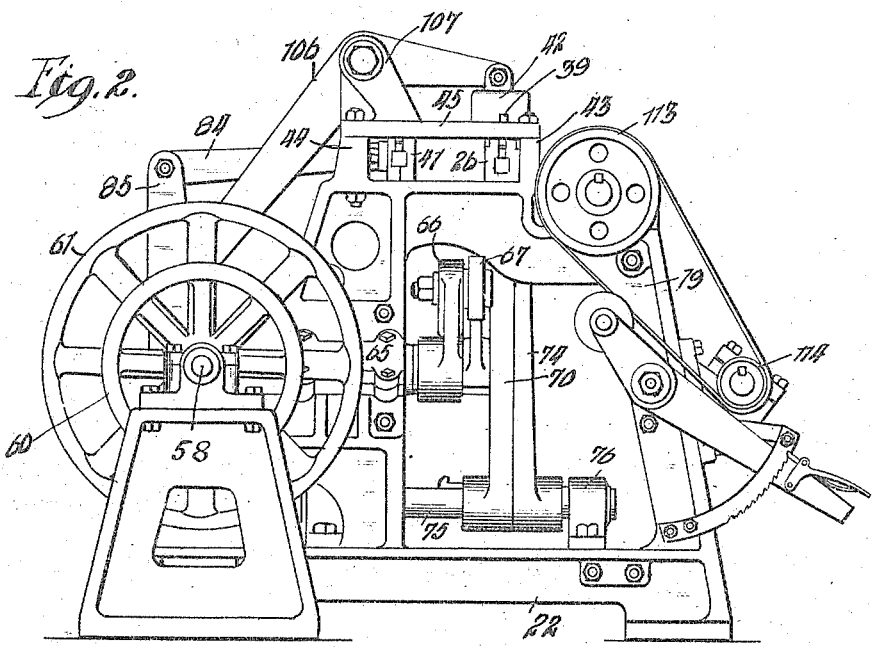
Figure 3:
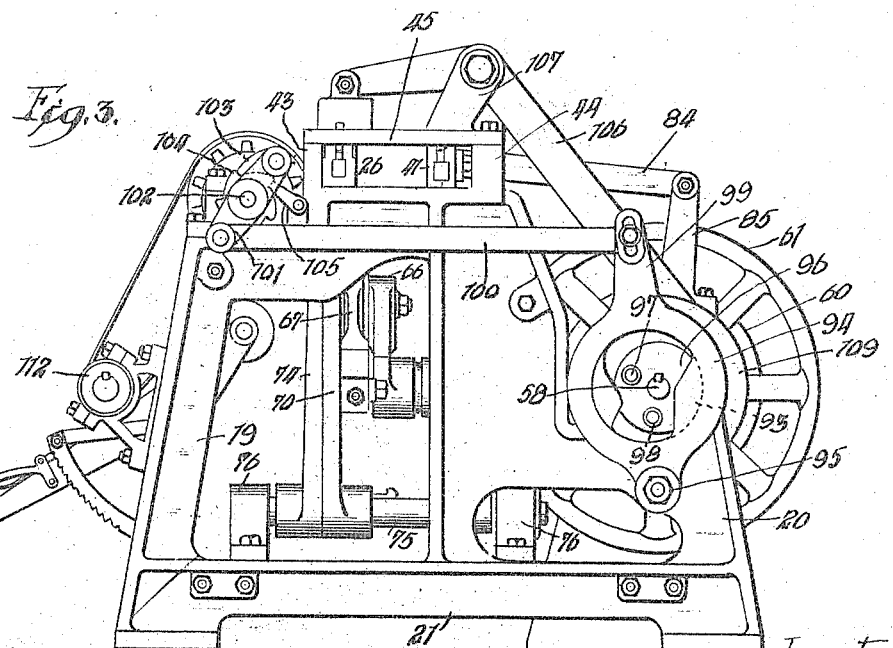
Figure 6:
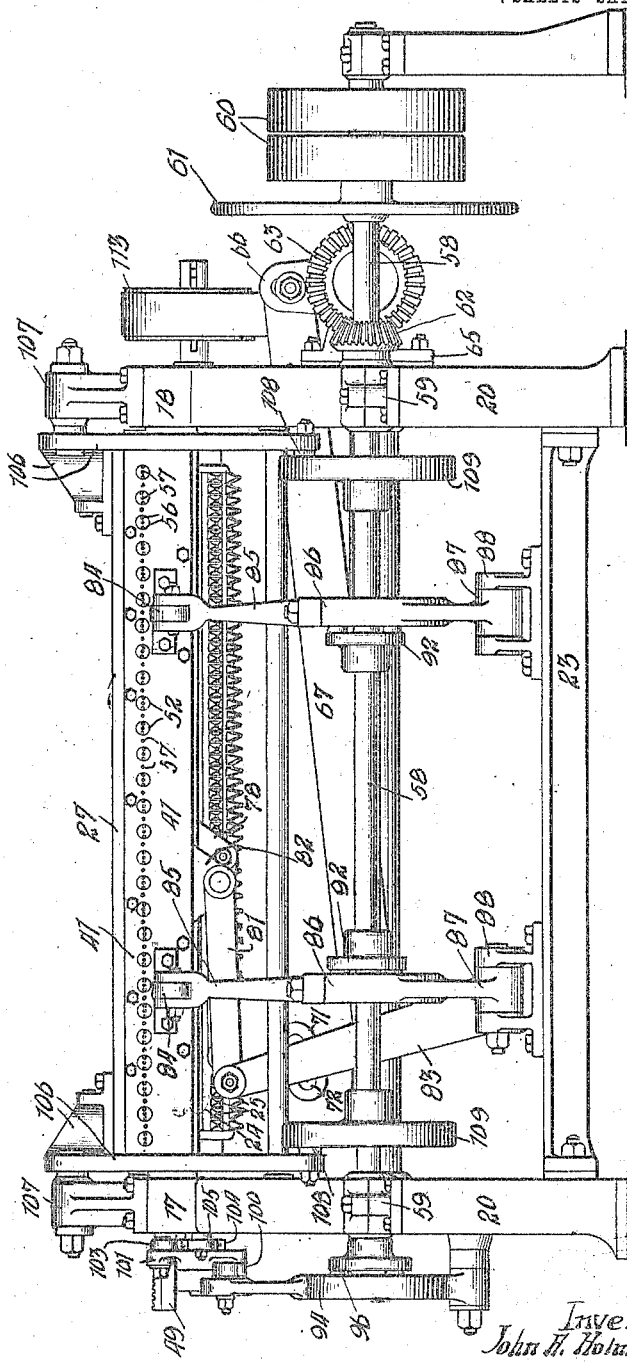
Figure 7:
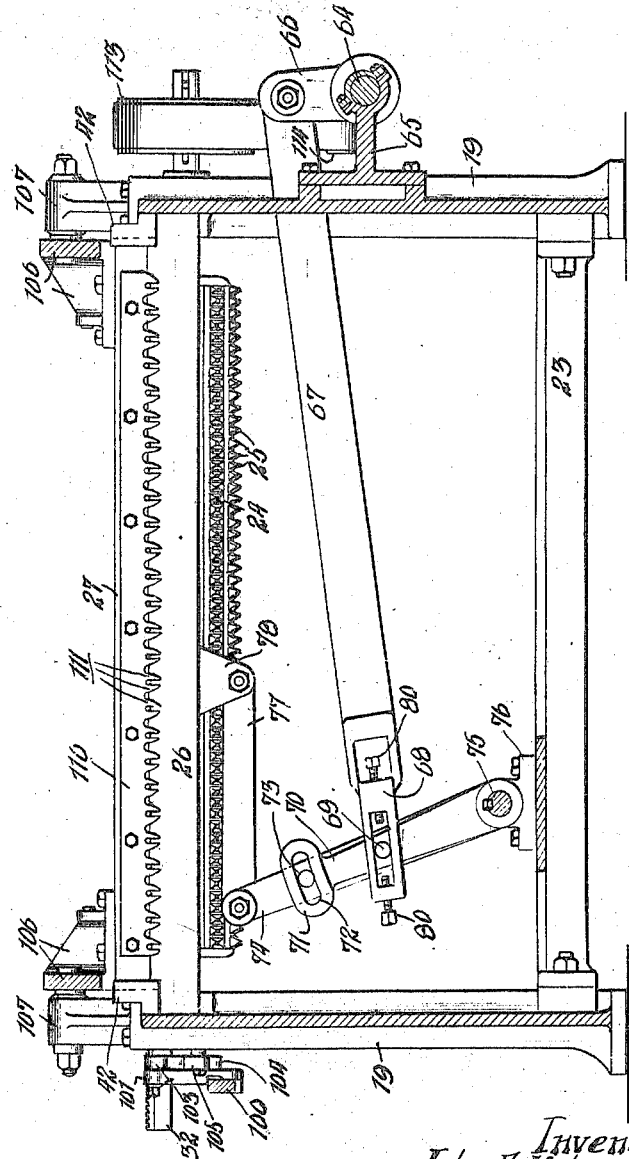
Figure 8:
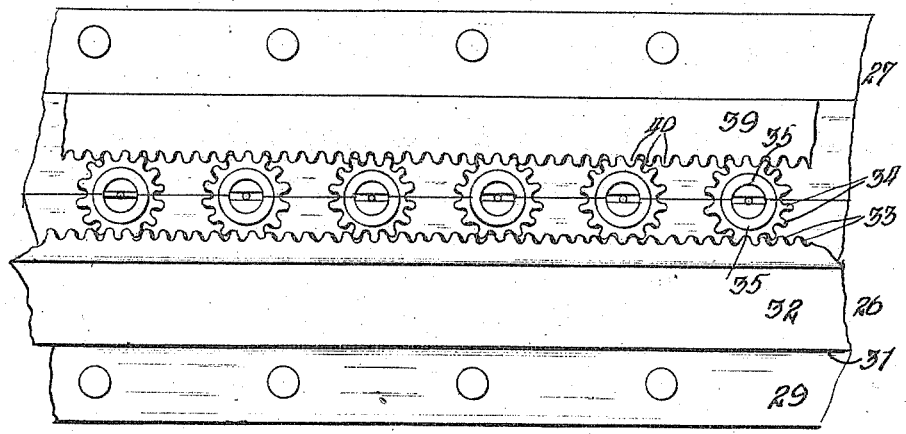
Figure 9:
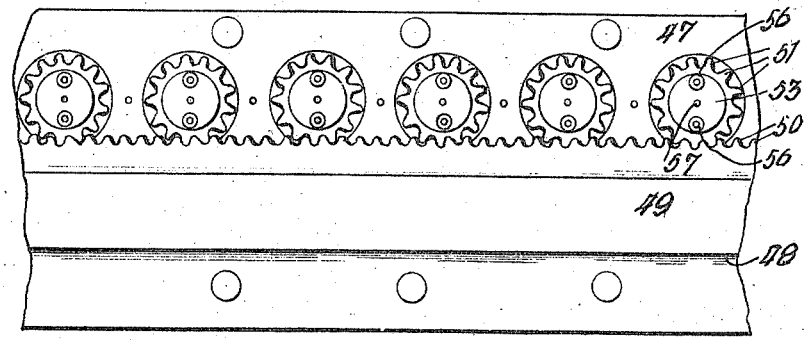
Figure 10:
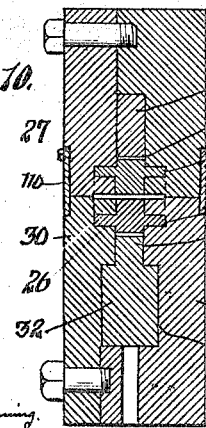
Figure 11:
Figure 12:
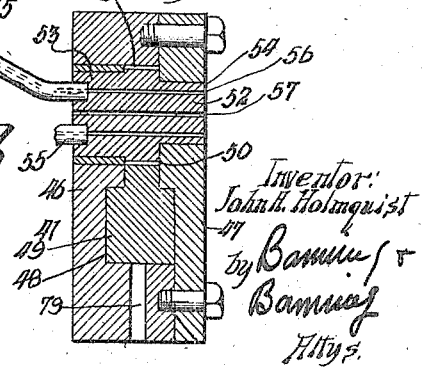
Figure 13:
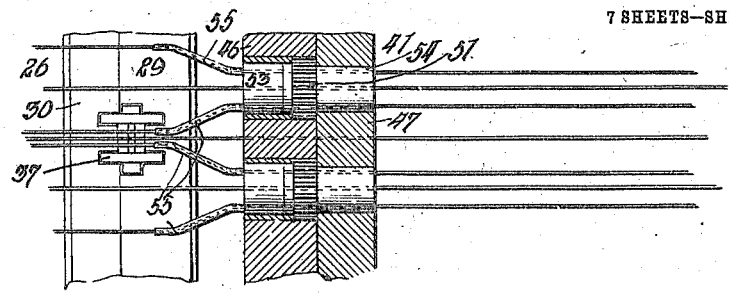
Figure 14:
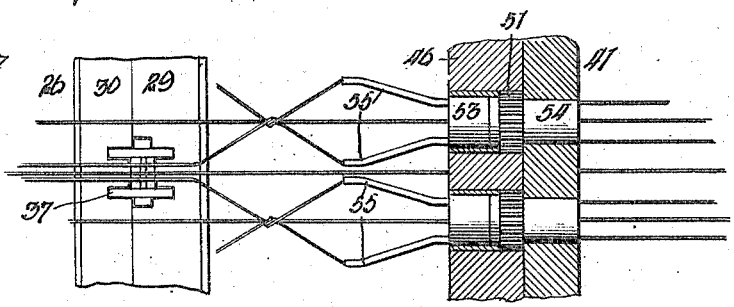
Figure 15:
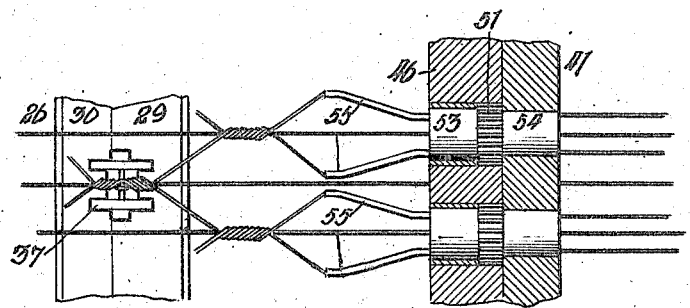
Figure 16:
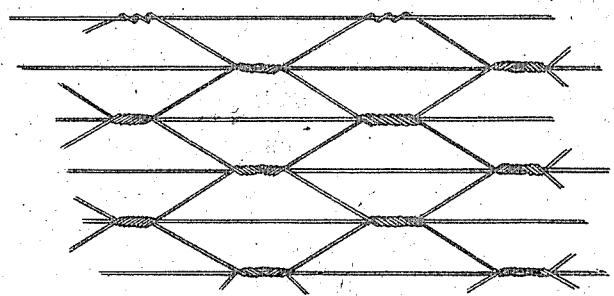

In the drawings, Figure 1 is a top or plan view of the machine as a whole; Figs. 2 and 3 side elevations of opposite sides of the machine; Fig. 4 a longitudinal sectional elevation, showing the rear cross head in retracted position; Fig. 5 a similar view, showing the rear cross head in advanced position; Fig. 6 a rear elevation of the machine; Fig. 7 a cross sectional elevation, looking toward the front of the machine; Fig. 8 a detail of the split coilers, with the rack bars for actuating and locking the same; Fig. 9 a detail, showing the twisters with the rack bar for actuating the same; Fig. 10 a cross sectional view of the forward cross head which carries the split coilers; Fig. 11 a perspective view of one of the split coilers; Fig. 12 a cross sectional view of the rear cross head, taken through one of the twisters; Fig. 13 a sectional plan view, showing the rear cross head with two of the twisters, and the forward cross head with one of the split coilers in contiguous position; Fig. 14 a similar view, showing the rear cross head in retracted position at the beginning of the twist; Fig. 15 a similar view, showing the twists and coils complete; and Fig. 16 a view of the section of the completed fence fabric.

The machine as a whole is built into a frame having upper side rails 17 and 18, the ends of which are supported upon forward and rear legs 19 and 20, respectively, which upwardly spring from the ends of lower connecting cross rails 21 and 22. The parts above described constitute side frames which are connected together by a base frame 23 which serves to unite the frame as a whole into a solid and integral structure. Obviously, the frame might be of other suitable and convenient formation.

Between the top side rails, near the front ends thereof, is journaled a take-up drum 24 provided, around its periphery, with longitudinally extending rows of guide lugs 25 of tapered formation, which lugs are positioned to enter through the meshes of the fence fabric and draw the completed fabric forward during the operation of the machine. To the rear of the take-up drum is located a forward transversely extending stationary cross head 26 which coöperates with a forward riser cross head 27, each of which cross heads carries a plurality of split coiler sections 28 of the form shown in Fig. 11.

Referring to Fig. 10, it will be seen that the forward stationary head consists preferably of a main rear section 29 and a front plate or section 30, the sections being formed to afford a longitudinally extending rectangular slot or bore 31, which serves as a guideway for the reciprocation of a driving rack bar 32 having rack teeth 33 which engage with rack teeth 34 on the lower split coiler sections, each of which sections comprises a half-cylindrical hub portion 35, around the center of which the teeth are formed; and within the hub portion is a clamping cross wall 36, the upper or clamping edge of which lies slightly below the ends of the half-cylindrical hub portion. The upper split coiler sections are exactly similar to the lower sections, the formation being such that when the mesh wires are entered between the upper and lower coiler sections there will be sufficient clearance between the coöperating edges of the clamping cross walls of the two split coiler sections to permit the ends of the hubs to abut against one another, while at the same time tightly clamping the mesh wires in preparation for the rotation of the split coiler sections. The split coiler sections are journaled within half-cylindrical undercut slots 37 and 38 in the adjacent faces of the lower and riser cross heads, respectively, which arrangement permits the coiler sections of each split coiler to rotate when actuated by the driving rack, without additional journal mountings therefor. This method of mounting split coilers is well understood in the art and need not be further described.

In order to keep the upper split coiler sections in perfect register with one another and cause them to be simultaneously and uniformly rotated, a locking rack bar 39 is provided, which is slidably mounted within the forward riser cross head and is provided with teeth 40 which engage the teeth of the upper split coiler sections. The locking rack bar need not be positively driven, since the upper sections of the split coilers will be rotated by reason of their engagement with the lower split coiler sections, which are positively driven by the reciprocation of the driving rack bar 32.

To the rear of the forward stationary cross head is a rear slidable cross head 41 which extends parallel with and is adapted to advance toward and recede from the forward stationary cross head, in order to guide the advancing strands of wire up to the split coilers prior to the coiling operation. The ends of the rear cross head 41 are slidably mounted within guideways 42 in the form of superstructures built up from the side rails of the machine frame near the center thereof. Each of the guideways is provided, at its forward end, with a forward shoulder or abutment 43, which forms a permanent bearing or reinforcement for the forward stationary cross head. Each of the guideways, at its rear end, similarly terminates in a rear shoulder or abutment 44, and the two shoulders or abutments of each of the guideways are connected by a plate 45, which bridges the space between the shoulders or abutments and forms an inclosed guideway, as best shown in Figs. 2 and 3. The construction of the movable rear cross head is best illustrated in Fig. 12, from which it will be seen that it comprises a main body portion 46 and an inclosing plate 47, the two portions of the cross head being cut to afford a longitudinally extending rectangular slot or bore 48, which furnishes a guideway for the reciprocation of a twister rack bar 49 provided with teeth 50 which engage with the teeth 51 of a plurality of twisters 52, each of which comprises a forward head portion 53 and a rear stem portion 54 of reduced diameter, the teeth being formed intermediate the head and stem of the twister. Each twister head is provided with a pair of diverging forwardly extending tubular fingers 55, the bores of which register with a pair of mesh wire passage holes 56 which extend in parallel relation through the twister, one on each side of a central hole or passageway 57 through which the strand wire is entered, where the machine is employed in weaving a fence employing longitudinal strand wires in combination with the interwoven mesh fabric, as is particularly desirable in weaving field fencing as distinguished from poultry netting.

Referring to Figs. 12, 13 and 14, it will be seen that the twisters are arranged in staggered relation with respect to the split coilers and that the divergence of the twister fingers is such that, when the entire line of fingers are in normal position and in the same horizontal plane with one another, the adjacent fingers of adjacent twisters will lie close together, so that the strands of wire fed through the two adjacent twister fingers will pass through the same split coiler. The arrangement is such that when the rear cross head, with the entire bank of twisters, is advanced to its fullest extent, it will guide and deliver the mesh wires directly between the companion sections of one of the split coilers, which, during this period of operation, will be separated or opened by the rise of the riser cross-head, so as to afford an easy entrance for the twister fingers into position to deliver the wires to the proper point. Thereafter the rear movable cross-head will recede and the riser cross-head descend to clamp the mesh wires previously delivered by the twister fingers, in position between the split coiler sections.

Power for performing the various operations above mentioned is derived from a main driving shaft 58, which is journaled within journal boxes 59 located about half way up on the outside of the rear legs 20 of the machine frame. The shaft is provided, at one end, with a fast-and-loose pulley wheel 60 and a balance or fly-wheel 61 for equalizing the motion of the shaft. Immediately inside of the fly-wheel the shaft has keyed thereon a driving bevel pinion 62 which meshes with a transmission bevel pinion 63, the ratio between the two bevel pinions being as 1 is to 2. The transmission bevel pinion is located at the rear end of a transmission shaft 64 which is suitably journaled within journal brackets 65, which are bolted or otherwise secured to the adjacent side frame of the machine. The transmission shaft has keyed thereon, at a suitable point, a crank-arm 66, which, in turn, has pivoted to its end a pitman bar 67, the opposite end of which is provided with a slotted fitting 68 which receives a pin or stud 69 outwardly projecting from a primary lever 70, the upper end of which is provided with an enlarged head 71 having an elongated slot 72 which receives a pin or stud 73 outwardly projecting from the side of the secondary lever 74 and near the upper end of such lever. The lower end of the primary lever is keyed to a rock shaft 75 which is mounted within journal bearings 76 on the base frame of the machine; and the secondary lever is loosely mounted upon said shaft and is adapted to be actuated by the engagement of the slotted head 71 with the pin or stud 73. The secondary lever is connected by means of a link 77 with a tongue 78 which operates the rear rack through a slot 79 in the rear cross head, which slot need only be of sufficient length to permit the necessary reciprocation of the tongue when actuated by the link.

In order to regulate the length of stroke of the rack bar, the slotted fitting 68 is provided, at each end, with an adjusting screw 80, which screws serve as adjustable abutments for regulating the time of engagement with the pin or stud 69 on the primary lever.

The forward driving rack bar is operated by means of a link 81 which is pivoted to a tongue 82 depending from the forward driving rack bar; and the link, at its outer end, is pivoted by means of an elongated pin 82ª to a lever arm 83, which is keyed or otherwise rigidly mounted upon the rock shaft 75. It is desirable, in the operation of the machine, that the parts be adjusted so that the complete operation will embrace three complete turns of the twisters and two complete turns of the split coilers.

The machine is so constructed that the rear or twister cross head will advance simultaneously with the forward movement of the take-up drum and at a speed commensurate therewith, and, in order to accomplish this result, the following mechanism is provided: The rear cross head has pivoted thereto and rearwardly extending therefrom, links 84, each of which has its rear end pivoted to the bifurcated upper end of an arm 85 which upwardly extends from and is bolted to a cam head 86, the lower side of which is provided with a depending ear 87 which is pivoted to a bracket 88 on the base frame of the machine. Each cam head, as shown, is provided, in its center, with a cam slot 89, of the formation shown in Figs. 4 and 5, the edges of which slot converge slightly toward their centers and recede toward their ends. The convergent edges of the cam slot coöperate with pins or rollers 90 and 91, which inwardly project from the face of a disk 92 keyed to the driving shaft 58; and the pin or roller 91 is shorter than the pin 90 to permit it to pass under the forward edge of the cam slot, which is recessed or undercut at the point 93 to the extent necessary to permit such passage and at the same time to afford engagement for the longer pin 90 when the latter has reached its forward position. The short pin 91, however, is of a length to engage the rear edge of the cam slot very shortly after the release of the forward undercut edge of the cam slot by the pin 90, with the result that there will be a very quick return movement imparted to the rear or twister cross head immediately after its period of advance.

The take-up drum is actuated by a cam movement identical to that just described, which is imparted through a cam head 94 pivoted to the machine frame at the point 95, and provided with a cam slot 96 identical to that previously described, the forward and rear edges of which slot are adapted to be engaged by long and short pins 97 and 98, respectively. The cam head is provided with an upwardly extending arm 99, which is slotted and has pivoted thereto the rear end of a rocking bar 100, the forward end of which is pivoted to the lower end of a pawl lever 101, which is loosely journaled to the end of a shaft 102 which carries the take-up drum. The upper end of the pawl lever has pivoted thereto a pawl 103, which co-acts with the teeth of a ratchet wheel 104 which is rigidly connected with the take-up drum shaft 102. Return movement of the drum is prevented by a detent 105, pivoted at a point adjacent to and at the rear side of the ratchet wheel.

The riser cross-head is actuated by means of a pair of inverted L levers 106, each of which is pivoted, at its bend or elbow, to a bracket arm 107, which rises from and is integrally formed with the adjacent plate 45. The rear end of each of the L levers is provided with a stud or roller 108 which enters a cam groove or track formed in the face of a cam disk 109 carried by the main driving shaft, the formation of the cam being such as to elevate the forward upper or riser cross-head immediately prior to each advance movement of the take-up drum and the rear or twister cross-head.

In order to hold the mesh wires distended in proper position during the twisting operation, the riser cross-head is provided, on its front and rear sides, with guide plates 110, the lower edges of which are serrated to afford tapered slotted fingers 111, between which a pair of adjacent to-be-coiled mesh wires are held during the coiling operation, the slots in the fingers furnishing an entrance for the strand wires when such wires are employed. The completed fencing is wound up on a winding drum 112 journaled below the take-up drum on the forward side of the machine and driven simultaneously with the take-up drum by means of a belt which encircles pulleys 113 and 114, which are mounted upon the shafts for the take-up and winding drums, respectively, or in any other suitable manner.

The operation of the machine is as follows: The mesh wires are threaded in pairs through the holes in the twisters and through the diverging tubular fingers, and are then carried forward between the split coiler sections, which, as before stated, are arranged in staggered relation with respect to the twisters, so that each of the coilers will receive the mesh wires from the adjacent fingers of adjacent twisters. Where strand wires are also employed, they are threaded through the center holes in the twisters and through the split coiler sections between the mesh wires. After all of the wires have been thus threaded, the machine is started and the weaving commences. The rotation of the driving shaft first causes the descent of the riser cross head, which brings the upper and lower sections of the split coilers into co-acting register with one another and at the same time brings the spreader fingers into position to hold the wires distended during the weaving operation. With the wires thus clamped and held between the coiler sections, and with the rear cross head in its retracted position, the next movement which will take place will be an initial movement of the twister rack bar, the operation of which is preferably timed to impart a single initial twist to the wires prior to the initial rotation of the split coilers. After this initial twist has been given, the split coilers will begin to rotate, and are preferably timed to complete two rotations simultaneously with two further rotations of the twisters, so that the completed fabric will have a line of doubly coiled locking coils, formed by the split coilers, and a line of triply wound twists, formed by the twisters with each full operation of the machine. After a line of coils and a line of twists have been thus formed, the riser head will be again elevated to release the completed section of fabric, and immediately thereafter the take-up drum and the rear cross head will be simultaneously actuated at coördinate rates of speed, so that a section of fence fabric, comprising two complete lines of meshes, will advance and be taken up by the take-up drum, and the fresh or uncoiled mesh wires guided and delivered to the split coilers by the twister fingers which advance clear up to the coilers, thereby positively and uniformly delivering and spacing the fresh wire prior to the next succeeding operation. Immediately thereafter the riser head will descend and the rear cross head recede to its twisting position, which is a position sufficiently to the rear of the split coilers to permit the formation of the twists at a point substantially half way between the ends of the fingers and the points of engagement of the wires by the split coilers. The twisters and coilers will be actuated first in one direction and then in the other, by the reciprocations of the racks which control their movements, so that in the completed fence fabric the twists and coils will alternate from right to left and from left to right, thereby greatly increasing the grip of the coils and twists on the strand wires, and resulting in a strong and highly efficient style of mesh fencing in which coils and twists will succeed one another.

It will be seen from the foregoing description that the machine is one of practically double the efficiency of machines employing a single line of twisters of the ordinary character. The coilers are capable of operating upon a section of fence which could not be woven by means of twisters, which must, of necessity, perform their operations at the extreme rear end of the completed fabric; whereas the coilers are enabled to operate upon intermediate sections of the fabric, since it is not necessary for the coilers to bodily pass the mesh wires over and under one another, but only necessary for them to act upon the bends or angles of the meshes intended to be coiled together.

I claim:

1. In a machine for weaving fence fabric, the combination of a plurality of twisters, a plurality of split coilers located in advance of the twisters, means for operating the twisters, means for operating the split coilers, and means for advancing the fabric after the twisting and coiling operations.

2. In a machine for weaving fence fabric, the combination of a plurality of twisters, a plurality of split coilers located in advance of the twisters, a stationary cross head for mounting the lower series of split coiler sections, a riser cross head for mounting the upper series of split coiler sections, means for rotating the twisters, means for raising and lowering the riser cross head, means for rotating the split coilers when the sections thereof are in register, and means for advancing the fabric after the twisting and coiling operations.

3. In a machine for weaving fence fabric, the combination of a plurality of twisters, a plurality of split coilers arranged forwardly of the twisters and in staggered relation with respect thereto, means for rotating the twisters, means for rotating the split coilers, and means for advancing the fabric after the twisting and coiling operations.

4. In a m...hine for weaving fence fabric, the combination of a plurality of twisters, a plurality of split coilers arranged forwardly of the twisters and in staggered relation with respect thereto, a lower stationary cross head for mounting the lower series of split coiler sections, a riser cross head for mounting the upper series of split coiler sections, means for rotating the twisters, means for rotating the split coilers, means for raising and lowering the riser cross head intermediate the periods of rotation of the twisters and coilers, and means for advancing the fabric after such periods of rotation.

5. In a machine for weaving fence fabric, the combination of a rear cross head adapted to travel back and forth in the line of movement of the wires, a plurality of twisters rotatably mounted in the rear cross head, a plurality of split coilers rotatably mounted in advance of the twisters, means for rotating the twisters, means for rotating the split coilers, means for advancing the fabric after the twisting and coiling operations, and means for advancing the rear cross head simultaneously with the advance of the fabric.

6. In a machine for weaving fence fabric, the combination of a rear cross head adapted to travel back and forth in the line of movement of the wires, a plurality of twisters rotatably mounted in the rear cross head, a plurality of split coilers rotatably mounted in advance of the twisters and in staggered relation with respect thereto, means for rotating the twisters, means for rotating the split coilers, means for advancing the fabric after the twisting and coiling operations, and means for advancing the rear cross head simultaneously with the advance of the fabric.

7. In a machine for weaving fence fabric, the combination of a rear cross head adapted to travel back and forth in the line of movement of the wires, a plurality of twisters rotatably mounted in the rear cross head and each provided with a pair of divergent tubular fingers, a plurality of split coilers rotatably mounted in advance of the twisters and in staggered relation with respect thereto, means for rotating the twisters, means for rotating the split coilers, means for advancing the fabric after the twisting and coiling operations, and means for advancing the rear cross head simultaneously with the advance of the fabric.

8. In a machine for weaving fence fabric, the combination of a rear cross head adapted to travel back and forth in the line of movement of the wires, a plurality of twisters rotatably mounted in the rear cross head and each provided with a pair of divergent tubular fingers affording guideways for the wires, a plurality of rotatably mounted split coilers located forwardly of and in staggered relation with respect to the twisters and in position to receive wires from the adjacent fingers of adjacent twisters, means for rotating the twisters, means for rotating the split coilers, means for taking up the completed fabric, and means for advancing the rear cross head simultaneously with the take-up movement of the fabric.

9. In a machine for weaving fence fabric, the combination of a rear cross head mounted to travel back and forth in the line of movement of the wires, a plurality of twisters rotatably mounted in the rear cross head and each provided with a pair of divergent tubular fingers adapted to guide the wires, a forward fixed cross head, a forward riser cross head coöperating therewith, coöperating split coiler sections rotatably mounted in the forward cross heads and arranged in staggered relation with respect to the twisters, each split coiler being in position to receive wires from adjacent fingers of adjacent twisters, means for rotating the twisters, means for rotating the split coilers, means for raising and lowering the riser cross head intermediate such periods of rotation, means for advancing the completed fabric after the rise of the riser cross head, and means for advancing the rear cross head simultaneously with the advance of the fabric.

10. In a machine for weaving fence fabric, the combination of a rear cross head mounted to travel back and forth in the line of movement of the wires, a plurality of twisters rotatably mounted in the rear cross head and each provided with a pair of divergent tubular fingers adapted to guide the wires, a forward fixed cross head, a forward riser cross head coöperating therewith, coöperating split coiler sections rotatably mounted in the forward cross heads and arranged in staggered relation with respect to the twisters, each split coiler being in position to receive wires from adjacent fingers of adjacent twisters, a rack bar for rotating the twisters, a rack bar mounted in the forward fixed cross head for rotating the split coilers, means for raising and lowering the riser cross head intermediate such periods of rotation, means for advancing the completed fabric after the rise of the riser cross head, and means for advancing the rear cross head simultaneously with the advance of the fabric.

11. In a machine for weaving fence fabric, the combination of a rear cross head mounted to travel back and forth in the line of movement of the wires, a plurality of twisters rotatably mounted in the rear cross head and each provided with a pair of divergent tubular fingers adapted to guide the wires, a forward fixed cross head, a forward riser cross head coöperating therewith, coöperating split coiler sections rotatably mounted in the forward cross heads and arranged in staggered relation with respect to the twisters, each split coiler being in position to receive wires from adjacent fingers of adjacent twisters, a rack bar for rotating the twisters, a rack bar mounted in the forward fixed cross head for rotating the split coilers, a locking rack bar in the riser cross head for coördinating the movements of the upper series of split coiler sections, means for raising and lowering the riser cross head intermediate such periods of rotation, means for advancing the completed fabric after the rise of the riser cross head, and means for advancing the rear cross head simultaneously with the advance of the fabric.

12. In a machine for weaving fence fabric, the combination of a rear cross head, a plurality of twisters rotatably mounted therein and adapted to act on the terminal sections of the wire, a plurality of coiling devices located forwardly of the twisters and adapted to act upon intermediate sections of the wire, means for actuating the twisters and coiling devices, and means for advancing the completed fence fabric after the twisting and coiling movements.

13. In a machine for weaving fence fabric, the combination of a rear cross head, a plurality of twisters rotatably mounted therein and adapted to act on the terminal sections of the wire, a plurality of coiling devices located forwardly of the twisters and adapted to act upon intermediate sections of the wire, and arranged in staggered relation with respect to the twisters, means for actuating the twisters and coiling devices, and means for advancing the completed fabric after the twisting and coiling movements.

14. In a machine for weaving fence fabric, the combination of a rear cross head, a plurality of twisters rotatably mounted therein and adapted to act on the terminal sections of the wire, a plurality of coiling devices located forwardly of the twisters and adapted to act upon intermediate sections of the wire, means for actuating the twisters and coiling devices alternately in opposite directions, and means for advancing the completed fabric after the twisting and coiling movements.

15. In a machine for weaving fence fabric, the combination of a rear cross head, a plurality of twisters rotatably mounted therein and adapted to act on the terminal sections of the wire, a plurality of coiling devices located forwardly of the twisters and adapted to act upon intermediate sections of the wire, and arranged in staggered relation with respect to the twisters, means for actuating the twisters and coiling devices alternately in opposite directions, and means for advancing the completed fabric after the twisting and coiling movements.

16. In a machine for weaving fence fabric, the combination of a plurality of twisters, a plurality of split coilers located in advance of the twisters, means for operating the twisters alternately in opposite directions, means for operating the split coilers alternately in opposite directions, and means for advancing the fabric after the twisting and coiling operations.

17. In a machine for weaving fence fabric, the combination of a plurality of twisters, a plurality of split coilers located in advance of the twisters, a stationary cross head for mounting the lower series of split coiler sections, a riser cross head for mounting the upper series of split coiler sections, means for rotating the twisters alternately in opposite directions, means for raising and lowering the riser cross head, means for rotating the split coilers alternately in opposite directions when the sections thereof are in register, and means for advancing the fabric after the twisting and coiling operations.

18. In a machine for weaving fence fabric, the combination of a plurality of twisters, a plurality of split coilers arranged forwardly of the twisters and in staggered relation with respect thereto, means for rotating the twisters alternately in opposite directions, means for rotating the split coilers alternately in opposite directions, and means for advancing the fabric after the twisting and coiling operations.

19. In a machine for weaving fence fabric, the combination of a plurality of twisters, a plurality of split coilers arranged forwardly of the twisters and in staggered relation with respect thereto, a lower stationary cross head for mounting the lower series of split coiler sections, a riser cross head for mounting the upper series of split coiler sections, means for rotating the twisters alternately in opposite directions, means for rotating the split coilers alternately in opposite directions, means for raising and lowering the riser cross head intermediate the periods of rotation of the twisters and coilers, and means for advancing the fabric after such periods of rotation.

20. In a machine for weaving fence fabric, the combination of a rear cross head adapted to travel back and forth in the line of movement of the wires, a plurality of twisters rotatably mounted in the rear cross head, a plurality of split coilers rotatably mounted in advance of the twisters, means for rotating the twisters alternately in opposite directions, means for rotating the split coilers alternately in opposite directions, means for advancing the fabric after the twisting and coiling operations, and means for advancing the rear cross head simultaneously with the advance of the fabric.

21. In a machine for weaving fence fabric, the combination of a rear cross head adapted to travel back and forth in the line of movement of the wires, a plurality of twisters rotatably mounted in the rear cross head, a plurality of split coilers rotatably mounted in advance of the twisters and in staggered relation with respect thereto, means for rotating the twisters alternately in opposite directions, means for rotating the split coilers alternately in opposite directions, means for advancing the fabric after the twisting and coiling operations, and means for advancing the rear cross head simultaneously with the advance of the fabric.

22. In a machine for weaving fence fabric, the combination of a rear cross head adapted to travel back and forth in the line of movement of the wires, a plurality of twisters rotatably mounted in the rear cross head and each provided with a pair of divergent tubular fingers, a plurality of split coilers rotatably mounted in advance of the twisters and in staggered relation with respect thereto, means for rotating the twisters alternately in opposite directions, means for rotating the split coilers alternately in opposite directions, means for advancing the fabric after the twisting and coiling operations, and means for advancing the rear cross head simultaneously with the advance of the fabric.

23. In a machine for weaving fence fabric, the combination of a rear cross head adapted to travel back and forth in the line of movement of the wires, a plurality of twisters rotatably mounted in the rear cross head and each provided with a pair of divergent tubular fingers affording guideways for the wires, a plurality of rotatably mounted split coilers located forwardly of the twisters and in staggered relation with respect thereto and in position to receive wires from the adjacent fingers of adjacent twisters, means for rotating the twisters alternately in opposite directions, means for rotating the split coilers alternately in opposite directions, means for taking up the completed fabric, and means for advancing the rear cross head simultaneously with the take-up movement of the fabric.

24. In a machine for weaving fence fabric, the combination of a rear cross head adapted to travel back and forth in the line of movement of the wires, a plurality of twisters rotatably mounted in the rear cross head and each provided with a pair of divergent tubular fingers furnishing guideways for the wires, a forward fixed cross head, a forward riser cross head coöperating therewith, coöperating split coiler sections rotatably mounted in the fixed forward cross head and riser cross head, a plurality of spreader fingers carried by the riser cross head for holding the wires spread during the twisting and coiling operations, means for rotating the twisters, means for rotating the split coilers, means for raising and lowering the riser cross head intermediate the twisting and coiling operations, means for advancing the fabric, and means for advancing the rear cross head simultaneously with the advance of the fabric.

25. In a machine for weaving fence fabric, the combination of a rear cross-head adapted to travel back and forth in the line of movement of the wires, a plurality of twisters rotatably mounted in the rear cross-head and each provided with a pair of divergent tubular fingers furnishing guideways for the wires, a forward fixed cross-head, a forward riser cross-head coöperating therewith, coöperating split coiler sections rotatably mounted in the fixed forward cross-head and riser cross-head, a plurality of spreader fingers carried by the riser cross-head for holding the wires spread during the twisting and coiling operations, means for rotating the twisters alternately in opposite directions, means for rotating the split coilers alternately in opposite directions, means for raising and lowering the riser cross-head intermediate the twisting and coiling operations, means for advancing the fabric, and means for advancing the rear cross-head simultaneously with the advance of the fabric.

JOHN A. HOLMQUIST.

Witnesses:
SAMUEL W. BANNING,
PIERSON W. BANNING.